United States Patent

Tsukamoto

[11] Patent Number: 6,133,899
[45] Date of Patent: Oct. 17, 2000

[54] PRINTING DEVICE FOR DISPLAYING A TITLE OF A STORED TEXT

[75] Inventor: Takahiro Tsukamoto, Mitaka, Japan

[73] Assignee: Canon Kabushiki Kaisha, Tokyo, Japan

[21] Appl. No.: 08/112,217

[22] Filed: Aug. 26, 1993

Related U.S. Application Data

[63] Continuation of application No. 07/638,020, Jan. 7, 1990, abandoned, which is a continuation of application No. 07/219,874, Jul. 12, 1988, abandoned, which is a continuation of application No. 06/791,379, Oct. 25, 1985, abandoned.

[30] Foreign Application Priority Data

Oct. 30, 1984 [JP] Japan .................................. 59-226642

[51] Int. Cl.$^7$ .............................. G09G 5/40; G06F 15/00
[52] U.S. Cl. ......................... 345/116; 345/141; 707/526; 707/530
[58] Field of Search ..................................... 345/156, 168, 345/169, 170, 171, 185, 192, 194, 112, 116, 141; 364/419.01, 419.19, 710.07, 419.17, 419.1; 395/144, 145, 146, 149; 707/526, 530

[56] References Cited

U.S. PATENT DOCUMENTS

| | | | |
|---|---|---|---|
| 3,757,037 | 9/1973 | Bialek | 340/712 |
| 4,394,649 | 7/1983 | Suchoff et al. | 340/711 |
| 4,437,127 | 3/1984 | Hirose | 364/419.19 |
| 4,527,917 | 7/1985 | Ueno | 400/479 |
| 4,601,003 | 7/1986 | Yoneyama et al. | 340/717 |
| 4,604,653 | 8/1986 | Shimizu | 395/145 |
| 4,646,250 | 2/1987 | Childress | 340/734 |
| 4,947,370 | 8/1990 | Sugitani | 364/419.19 |
| 5,319,790 | 6/1994 | Kumagai | 364/419.19 |

OTHER PUBLICATIONS

"Disk Operating System" by Microsoft Corp; First Edition (Sep./1983) Version 2–10 pp. 2–139/2–140.

*Primary Examiner*—Richard A. Hjerpe
*Assistant Examiner*—M. Fatahiyar
*Attorney, Agent, or Firm*—Fitzpatrick, Cella, Harper & Scinto

[57] ABSTRACT

An electronic apparatus includes storage units capable of storing a plurality of texts and a plurality of titles corresponding to each text. A display indicates whether a text has been stored in the storage unit or not by displaying a corresponding title chosen by a selector.

9 Claims, 10 Drawing Sheets

| | 22 | 23 | 24 | | |
|---|---|---|---|---|---|
| A : | REGISTERED | TEXT "A" START POINTER | TITLE CODE | LINK ADDRESS | ----- |
| B : | REGISTERED | TEXT "B" START POINTER | TITLE CODE | LINK ADDRESS | ----- |
| C : | REGISTERED | TEXT "C" START POINTER | | LINK ADDRESS | ----- |
| D : | UNREGISTERED | | | | |

CURSOR INDICATION

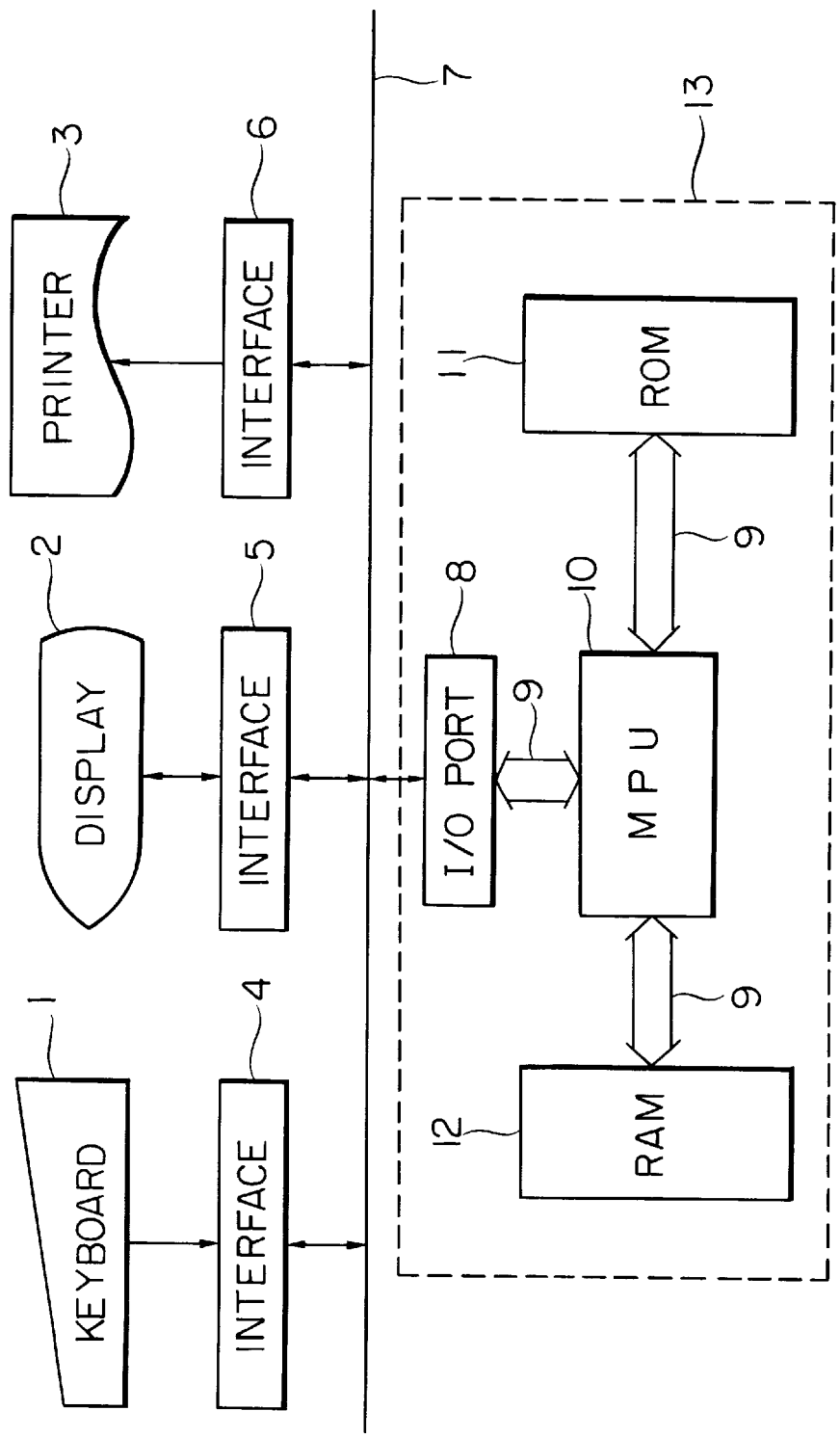

FIG. 4C

| 22 | 23 | 24 | 25 |
|---|---|---|---|
| A: | REGISTERED | TEXT "A" START POINTER | LINK ADDRESS |
| B: | REGISTERED | TEXT "B" START POINTER | LINK ADDRESS |
| C: | REGISTERED | TEXT "C" START POINTER | LINK ADDRESS |
| D: | UNREGISTERED | ---- | ---- |

FIG. 4D

| | 22 | 23 | 24 | | |
|---|---|---|---|---|---|
| A: | REGISTERED | TEXT "A" START POINTER | TITLE CODE | LINK ADDRESS | ---- |
| B: | REGISTERED | TEXT "B" START POINTER | TITLE CODE | LINK ADDRESS | ---- |
| C: | REGISTERED | TEXT "C" START POINTER | | LINK ADDRESS | ---- |
| D: | UNREGISTERED | ---- | ---- | ---- | |

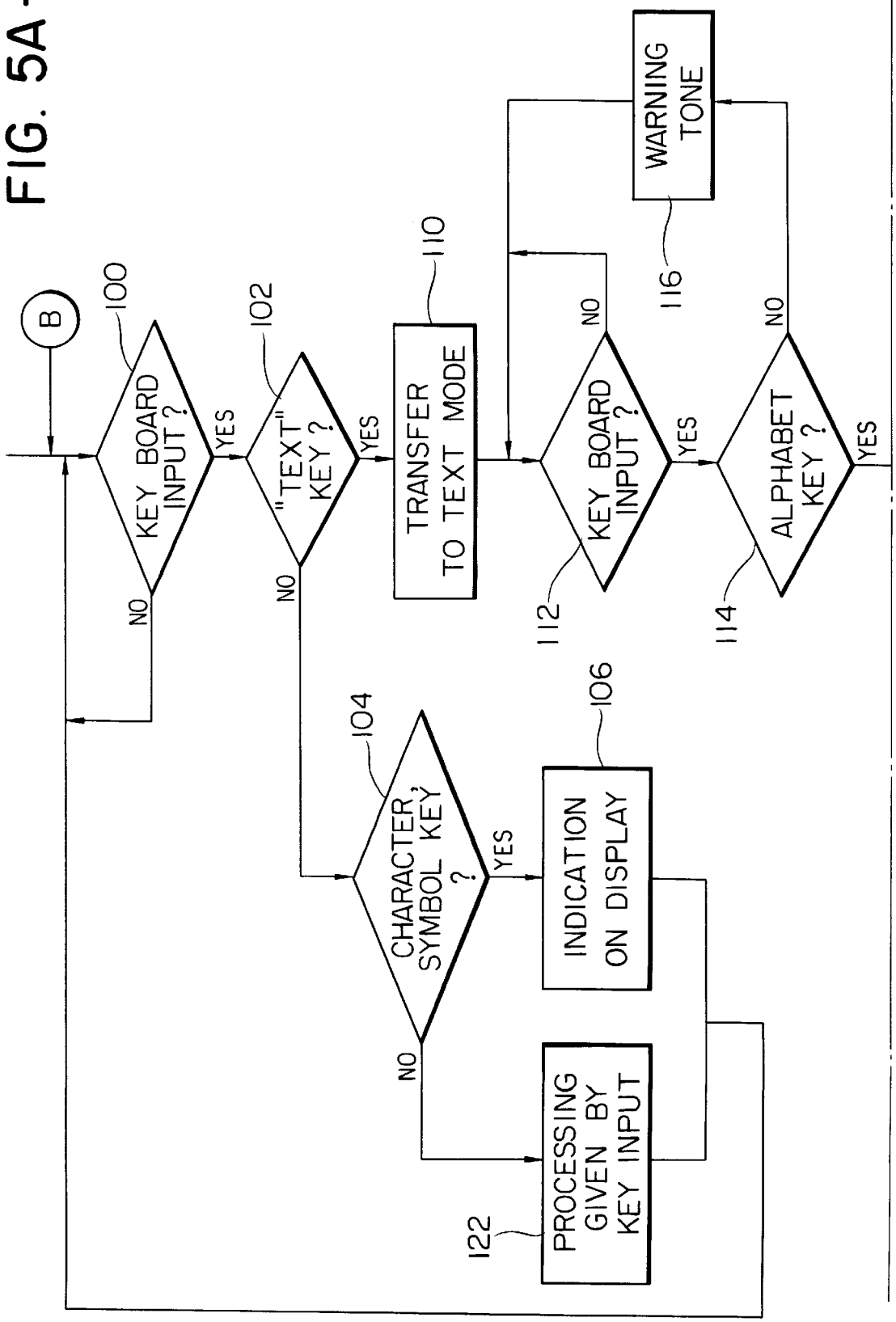

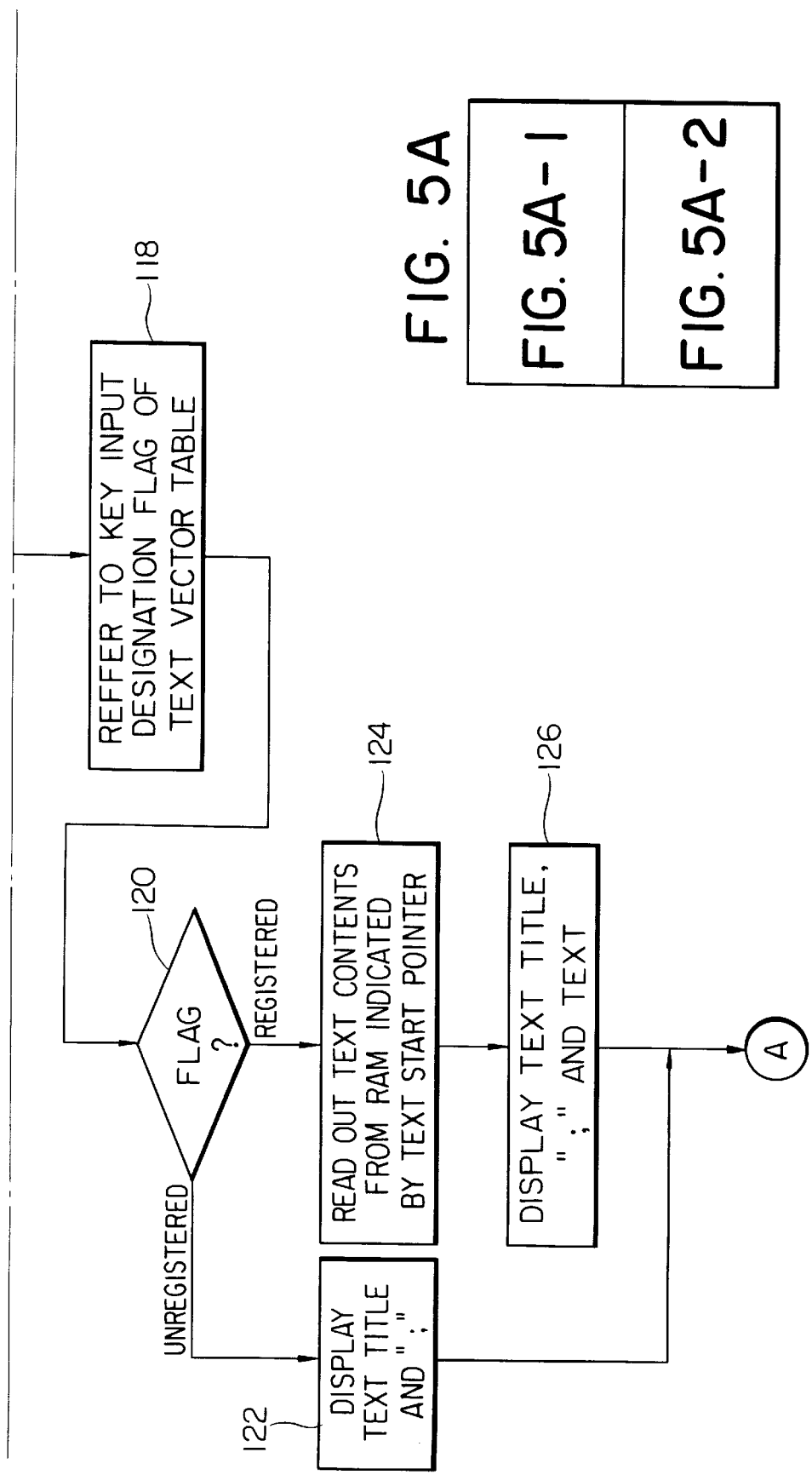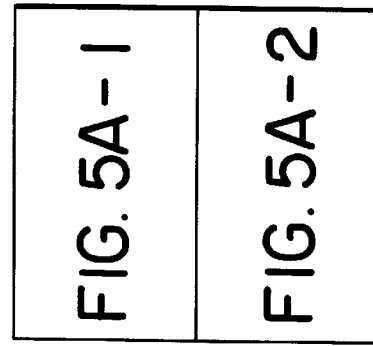

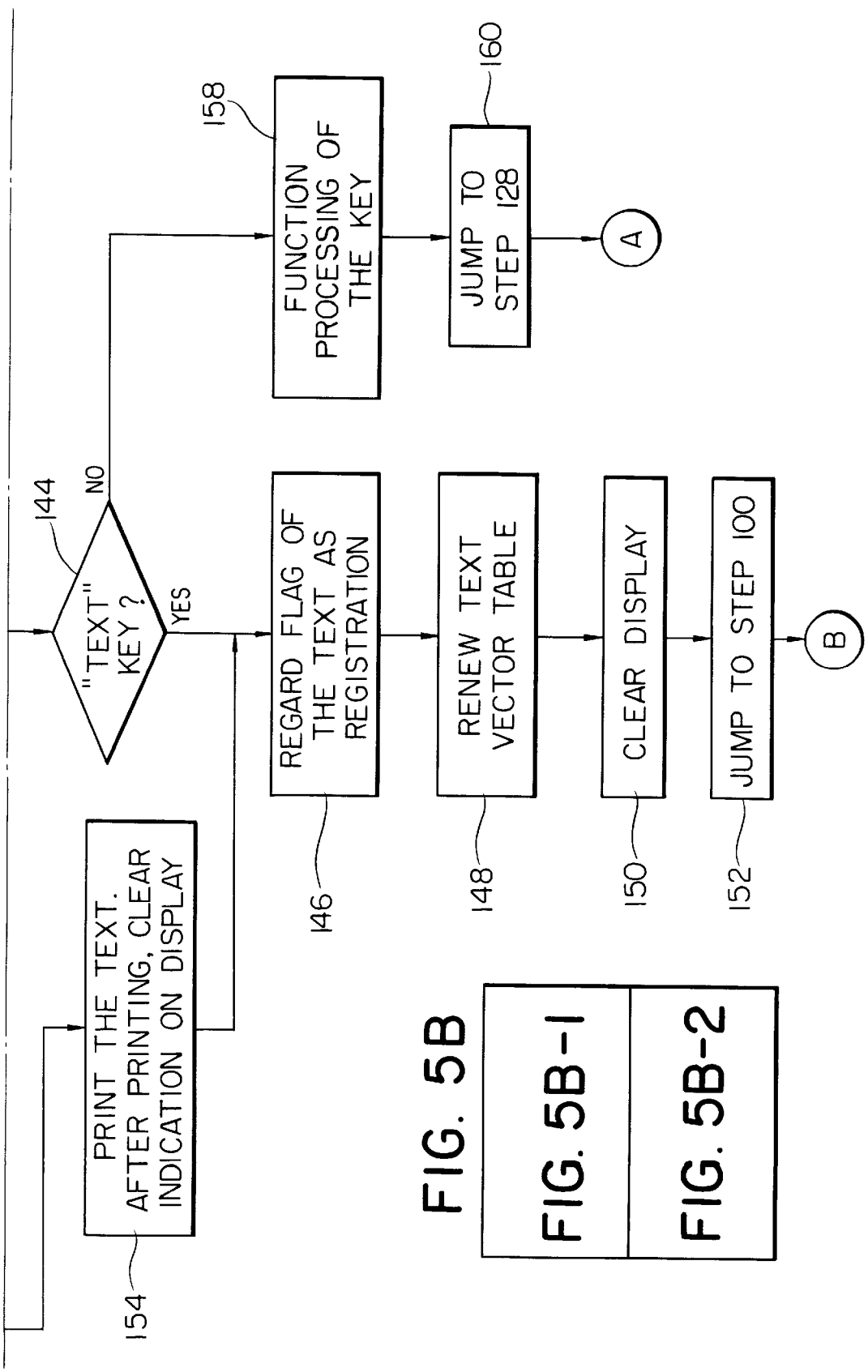

FIG. 6A

We have evaluated the performance of the countries where A-flex will be test marketed. As seen from below. the markets include countries with both stable and dynamic growth rates.

FIG. 6B

A: We have evaluated the performa

FIG. 6C

A: e have evaluated the performan

FIG. 7 x x A B C D E F G H I J K L M N O P Q R S T U V W X Y Z x x

PRINTING DEVICE FOR DISPLAYING A TITLE OF A STORED TEXT

This application is a continuation of application Ser. No. 07/638,020 filed Jan. 7, 1990, now abandoned, which is a continuation of application Ser. No. 07/219,874 filed Jul. 12, 1998, now abandoned, which is a continuation of application Ser. No. 06/791,379 filed Oct. 25, 1985, now abandoned.

BACKGROUND OF THE INVENTION

1. Field of the Invention

The present invention relates to a printing device that functions to edit and correct while displaying print information stored in storage means.

2. Description of the Prior Art

Printing devices such as typewriters are known to be provided with a control/arithmetic operation circuit using such as a microcomputer, a memory circuit such as RAMs, and the like. By additionally providing a display means such as a liquid crystal display, and a storage means for storing inputted data and the like, it is possible for the printing device of this type to have a function to edit, correct and print by reading the desired inputted data from the storage means and displaying it on the display means.

The storage means of the above-noted printing device can store in memory a plurality of texts (documents) each of which usually has its specific title (name). Thus, a particular text can be read as desired and can be displayed, corrected, registered and printed.

With conventional printing devices of this type, however, whether a text having a certain title has been registered or not is generally not known by the operator. Therefore, even in the case that a text having a certain title has previously been registered, the operator without knowing the fact might enter a text having the same title. This could be a problem such as breaking the previously stored text.

The printing device may be constructed such that the content of a text is always displayed when a title corresponding to the text is selected. In this case, even if the operator selects the same title whose text has previously been registered, the operator becomes aware of the state of registration, from the presence or absence of displayed characters or the like on the screen.

However, again in this case, if the previously registered text has a number of "spaces" (no indication) in its content, that portion of the document might be displayed on the display means without giving an indication. Therefore, the operator cannot judge whether such an indication is due to a number of "spaces" of the document or due to non-registration of the document. If a portion where the document has some characters is to be displayed, a display means of a large screen is required and this is not suitable for practical use.

SUMMARY OF THE INVENTION

It is an object of the present invention to provide an electronic apparatus capable of displaying whether a text has been registered or not.

It is another object of the present invention to provide an electronic apparatus capable of editing by selecting one of the displayed titles of the documents previously registered.

It is a further object of the present invention to provide an electronic apparatus capable of judging whether a selectable title has been selected or not.

It is a still further object of the present invention to provide an electronic apparatus capable of displaying the title of a text and a mark indicative of registration or non-registration of the text.

An electronic apparatus according to the present invention includes a memory for storing a plurality of texts and a display for displaying whether a text has been stored in the memory or not.

BRIEF DESCRIPTION OF THE DRAWINGS

FIG. 4A shows the construction of the embodiment;

FIG. 4C shows a map of a text vector table;

FIG. 4D shows a map of a text vector table;

FIGS. 5A and 5B are control flow charts of MPU 10;

FIG. 6A shows an example of an inputted document;

FIGS. 6B and 6C show examples of indications; and

FIG. 7 shows another example of indication.

DETAILED DESCRIPTION OF THE PREFERRED EMBODIMENTS

The embodiments of the invention will be described in detail with reference to the accompanying drawings.

Figure 1:
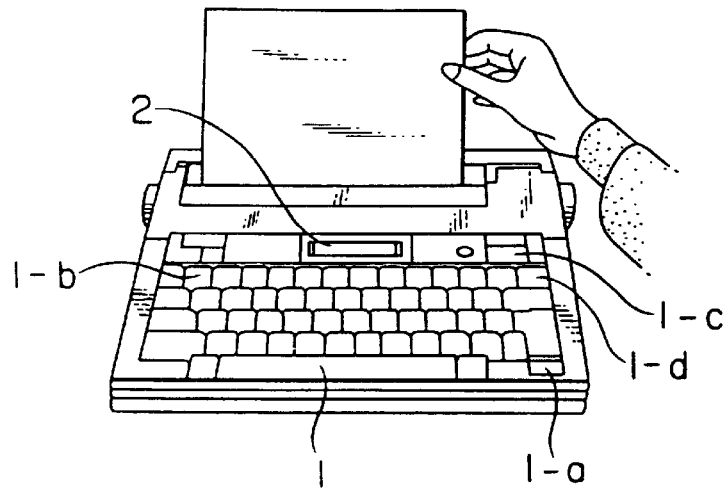
FIG. 1 shows an outer appearance of an embodiment of the invention.

FIG. 1 is a printing device. Reference numeral 1 represents a keyboard constituting input means, and reference numeral 2 represents a liquid crystal display of 32 characters per line constituting a display means. A printing unit is also provided. On the keyboard 1, there are provided a "TEXT" key 1-a, a "cursor movement" key 1-c, a "TEXTPRINT" key 1-d, an alphabet key group 1-b and so on.

FIG. 4A is a block diagram of the printing device according to an embodiment of the present invention.

Figures 1, 5B:
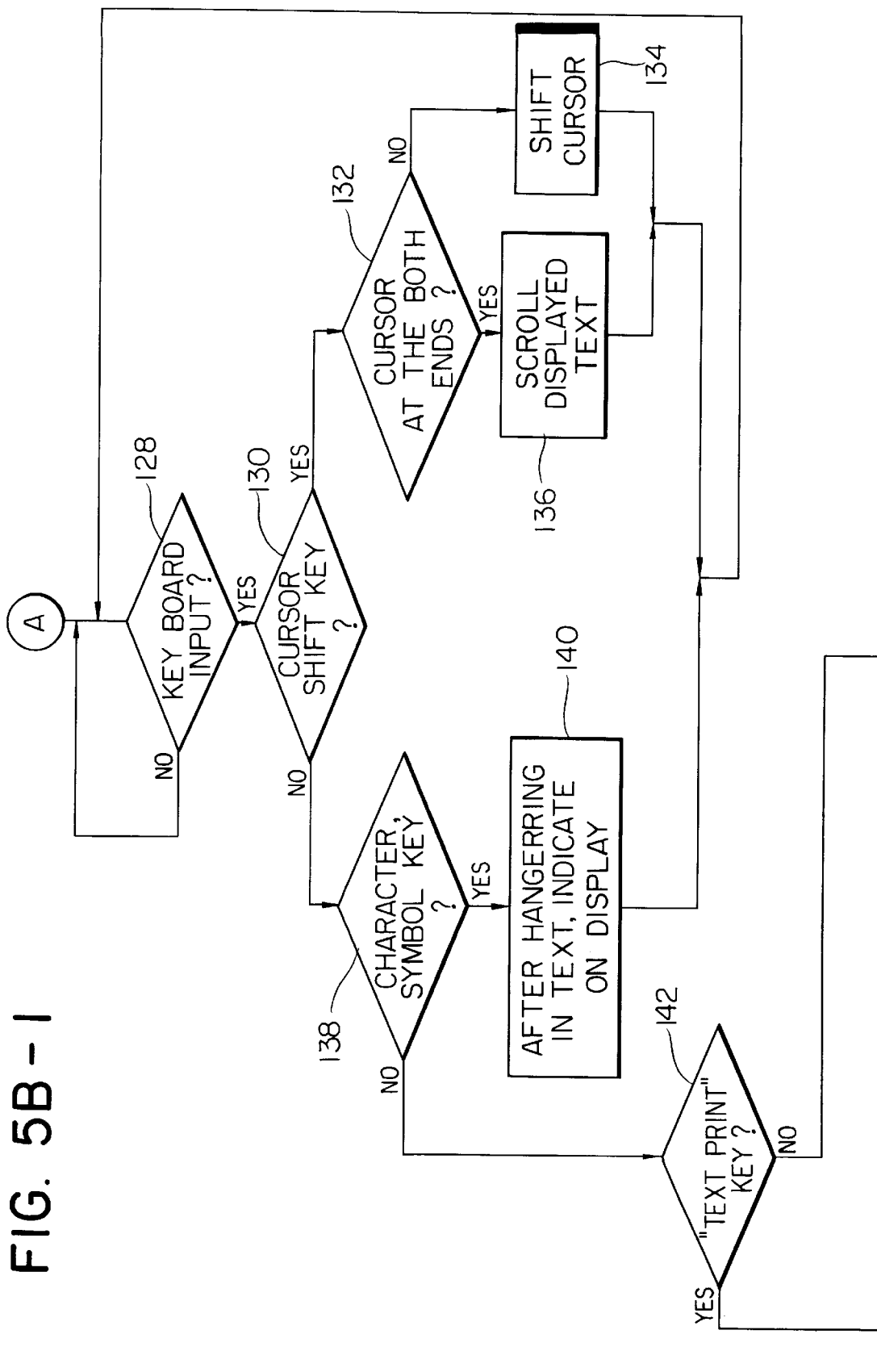

An MPU (micro processor unit and associated circuits) 10 in a control unit 13 is connected via system buses 9 to an I/O port 8, ROM 11 and RAM 12, MPU 10 interfaces through the I/O port 8 and an I/O bus 7 with the keyboard 1, display means 2 and printing means or printer 3. ROM 11 stores a control program for the whole system of the printing device, including specifically the control program for the control sequence as shown in FIGS. 5A and 5B.

Figure 4B:
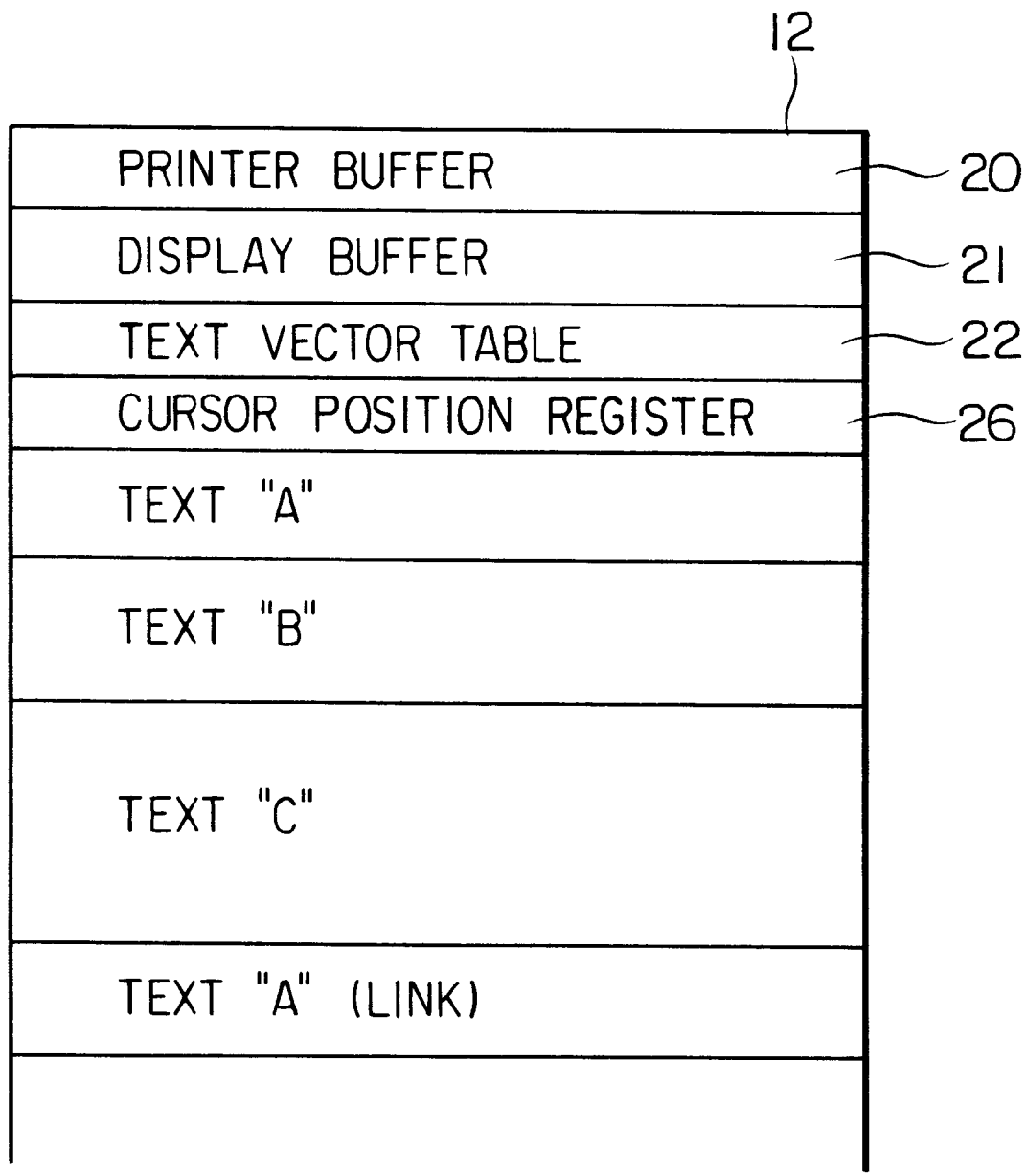
FIG. 4B shows a memory map of RAM 12.

FIG. 4B is a memory map of RAM 12. Reference numeral 20 represents a printer buffer for the printing means 3 to print one line. Reference numeral 21 denotes a display buffer of 32 bytes for the display means 2. Reference numeral 22 represents a text vector table which will be described later, and reference numeral 26 represents a cursor position register for registering a cursor position to be displayed on the display means 2. RAM 12 stores in addition registered texts such as text "A", text "B", text "C" . . . etc. Text "A" (link) is a continued part of text "A", which is not directly related to the present invention.

FIG. 4C is a memory map of the text vector table 22, the construction of the memory map being described later.

Figure 2:
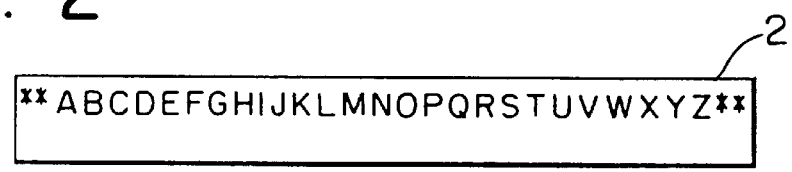
FIG. 2 is a view of a menu screen showing the titles of texts.

In the printing device of the above embodiment, the title of a text is represented by any one character of A to Z and the texts up to 26 texs may be stored. In the embodiment, upon depression of "TEXT" key 1-a, the printing device advances to a text mode where the alphabets A to Z are displayed on the display means 2 as shown in FIG. 2. The operator then selects a title by choosing a letter. As will be described later, although the printing device of the invention uses one letter of the alphabet as a title, any other printing device may be employed which uses an arbitrary title freely set by the operator.

Upon selection of one title among A to Z, the text vector table 2 of FIG. 4C is looked up. In the text vector table 22, texts are arranged from A to Z in this order. Reference 23 represents a flag indicative of non-registration/registration of a text, reference numeral 24 represents a text start pointer indicative of a start address of the text in RAM, and reference numeral 25 represents a link address indicative of the position of a continued text added to a certain text full in content.

In FIG. 4C, texts "A" to "C" are registered, while text "D" is not registered so that its text start pointer 24 and link address have not been identified as yet.

Figure 3A:
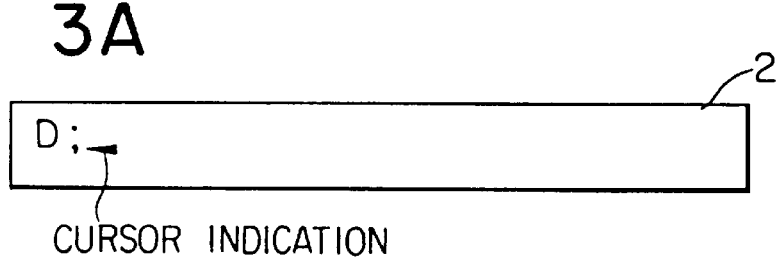
FIGS. 3A and 3B respectively show non-registration and registration of a text.
Figure 3B:
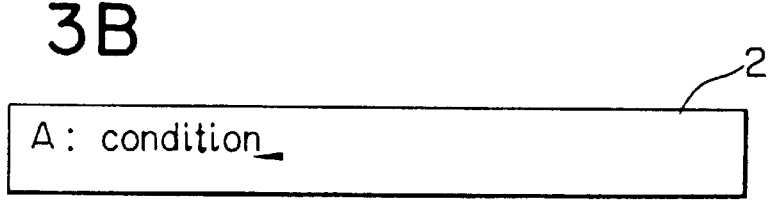

If the operator selects a title "D" whose text has not been registered, a title character "D" and an indication of non-registration ";" are displayed on the display means 2 as shown in FIG. 3A Alternatively, if the operator selects a title "A" whose text has been registered, a title character "A" and an indication of registration ":" as well as a top word "condition" of text "A" are displayed on the display means 2 as shown in FIG. 3B.

By displaying the marks indicative of non-registration/registration (in this embodiment ":" and ";") together with the title, the operator can know the state of non-registration/registration of the document file after the start of necessary operations (it is noted that the marks ":" and ";" indicative of non-registration/registration are not limited thereto).

Next, the control sequence of the printing device pertinent to the present invention will be described with reference to FIGS. 5A and 5B.

First, at step 100, key input by the operator is waited. If there is any keyboard input, the input is checked at step 102 if it is an input of "TEXT" key 1-a, that is, a mode selection input is waited.

If the input is not from "TEXT" key 1-a, then step 104 follows to check if the input is from a character or symbol key. If affirmative, step 106 follows to display the character or symbol on the display means 2. If negative, after a function processing corresponding to the key input is performed (step 108), step 100 resumes to wait for a new keyboard input. In steps 100 to 108, the printing device is in an "idle state" and does not give any influence upon the contents of the text unless a "TEXT" key input is received.

If a keyboard input at step 102 is identified as from "TEXT" key 1-a, then a text mode follows (step 110). Upon transfer to the text mode, as described previously, the display means 2 is actuated as shown in FIG. 2. The operator then selects any one title among A to Z. At steps 112 and 114, any one input of the alphabets A to Z is waited. If it is not a letter input, a warning tone is produced to notify the operator to such effect (step 116).

If any one character of A to Z is selected, step 118 follows to look up the text vector table 22 and identify the text having as its title the inputted character. Assuming that "A" is appointed, the flag 23 of text "A" is checked (step 120). Since text "A" has already been registered, the content of text "A" is read starting from the address indicated by the text start pointer 24 (step 124). At step 126, the display buffer 21 stores the text title "A", a mark ":" indicative of registration and the initial sentence or the like of the text and displays them on the display means 2 as shown in FIG. 3B.

Alternatively, if a non-registered text (for example text "D") is selected at steps 112 to 114, then the flow advances to steps 118, 120 and 122 so that title "D" and a mark ";" indicative of non-registration are displayed on the display means 2 as shown in FIG. 3A.

As stated above, display of FIGS. 3A or 3B depending upon non-registration or registration of the selected text enables the operator to notify the state of non-registration/registration of the selected text. Thereafter the flow advances to step 128.

The flow following step 128 shows the sequence of editing of a text. Therefore, keyboard input to be expected at step 128 is from the cursor movement key 1-c, character/symbol key group, "TEXTPRINT" key 1-d, "TEXT" key 1-a and the like.

If an input at step 128 is from the cursor movement key 1-c, then at step 132 the position of the cursor at that time is checked to see if it is at the right or left end of the display means 2. The left end here means the position next to the mark of registration/non-registration and the title character. If the cursor is located at the right or left end, the displayed text is scrolled (step 136). If the cursor does not locate at the right or left end, the cursor is moved (step 134). After steps 134 and 136, step 128 resumes to wait for a new input. In particular, assuming that the cursor locates at the position of the text of FIG. 6A as shown in FIG. 6B, the text will scroll as shown in FIG. 6C by turning the cursor movement key 1-c to the right side. In this way, the title of the text and mark of registration/non-registration are constantly kept displayed so that the operator can recognize the state of registration/non-registration during the operation.

If an input at step 128 is from the character/symbol key group (step 138), then step 140 follows to add to or change the text in RAM 12 at the current position of the cursor. In this case, similarly to the cursor movement key input, the title character and mark of registration/non-registration on the display means 2 are kept unchanged and the state of registration/non-registration can always be recognized, so the operator feels at rest in performing necessary operations.

If a keyboard input at step 128 is from the "TEXTPRINT" key 1-d, the flow advances to steps 128, 130, 38, 142 and 154 to print the text. After printing, the display means is cleared and step 146 follows. At step 146 if the text has not been registered as yet, the flag 23 of the text is set. At step 148, the link address 25 is renewed if necessary. The renewal of the text vector table 22 is thus performed. At step 150, the display means is completely cleared to notify the operator of the end of printing and renewal of the text vector table. Step 100 resumes thereafter to return to the "idle" state and wait for a mode setting.

If a keyboard input at step 128 is from the "TEXT" key 1-a, the flow advances to steps 128, 130, 138, 142, 144 and 146. This flow is the same as the flow processed at the "TEXTPRINT" key input except for the printing processing, therefore the description therefor is omitted.

If an input at step 128 is not from the cursor movement key 1-c, character/symbol key, "TEXT" key 1-a and "TEXTPRINT" key 1-d (e.g., an input from a Japanese syllabary kana/hiragana conversion key or the like), then step 158 follows to perform the corresponding processing to thereafter return to step 128 (step 160) to wait for a new key input.

According to the printing device of the embodiment, it is possible to make a new document formation, editing, registration and printing with a simple operation while confirming the title of the selected text and the state of registration/non-registration thereof.

Although the description of the embodiment has been made using an alphabet as the title for the convenience of description, the present invention is also applicable to the printing device using such a title as the operator may freely choose as desired. In this case, as shown in FIG. 4D, title codes are additionally provided within the text vector table 22. The text is then searched by using the title code at step 118. If there is the title, the title and mark of registration/non-registration are displayed on the display means (if the title is too long, only the mark may be displayed).

Furthermore, although the string of titles selectable at step 110 has been shown as in FIG. 2, marks 30 indicative of registration/non-registration state may be displayed under the corresponding titles, which leads to a similar effect as in the foregoing description.

As seen from the above description of the present invention, it is possible to display a text, correct it and form a new text with simple operations while confirming the state of registration/non-registration, to thereby prevent inadvertent breaking of the document already stored.

What I claimed is:

1. An electronic apparatus comprising:

text storage means for storing a plurality of texts;

title storage means for storing titles each corresponding to a different one of said plurality of texts stored in said text storage means;

indicating data generating means for generating data different from the plurality of texts indicating whether each of said plurality of texts, each corresponding to a different one of said titles stored in said title storage means, has or has not been stored;

indicating data memory means for storing said indicating data generated by said generating means, wherein said indicating data is stored relating to the title of the text stored in said text storage means;

selecting means for selecting a desired title from among said titles stored in said title storage means;

control means for reading the corresponding text from said text storage means, and reading the corresponding indicating data from said indicating data memory means, according to the selecting of said selecting means; and display means for displaying a symbol indicating that the title selected and corresponding text are stored and indicating the corresponding text, or displaying a symbol indicating that the title selected and the corresponding text are not stored wherein said display means is constructed to display in one line the title, the symbol, and at least a portion of the corresponding text.

2. An electronic apparatus according to claim 1, further comprising character input means for inputting data for selection of said selecting means.

3. An electronic apparatus according to claim 1, further comprising means for producing an indicia indicative of indicating data stored in said memory means.

4. A printing device comprising:

text storage means for storing a plurality of texts;

title storage means for storing titles each corresponding to a different one of said plurality of texts to be stored in said storage means;

indicating data memory means for storing first indicating data representing the condition that said text storage means stores a text corresponding to a searched for title stored in said title storage means and for storing second indicating data representing the condition that said text storage means does not store a text corresponding to a searched for title stored in said title storage means;

searching means for searching for a desired title among plural titles stored in said title storage means, and upon finding the desired title, then searching corresponding first indicating data or second indicating data from said indicating data memory means, and upon finding the first or second indicating data, then searching for a corresponding text from said text storage means;

display control means for displaying a symbol of the first indicating data indicating that the title selected and the corresponding text are stored and indicating the corresponding text, or displaying a symbol of the second indicating data indicating that the title selected and the corresponding text are not stored, wherein said display control means is constructed to display in one line the title, the symbol, and at least a portion of the corresponding text; and print means for outputting the text corresponding to the titles displayed by said display control means, wherein said print means is connected to said text storage means.

5. An electronic apparatus according to claim 4, further comprising selecting means for selecting a desired title from among said titles stored in said title storage means.

6. An electronic apparatus according to claim 4, wherein said display means includes a one-line display unit.

7. An electronic apparatus according to claim 4, further comprising means for producing an indicia indicative of indicating data stored in said memory means.

8. A printing apparatus comprising:

input means for inputting a plurality of texts and titles;

text memory means for separately storing the plurality of texts input by said input means;

title memory means for storing a plurality of titles corresponding to the plurality of texts;

retrieving control means for retrieving, based on the title inputted from said input means, information indicating whether said text memory means has stored one of the plurality of said input texts, in order to inform an operator of a vacant memory area in said text memory means;

display control means, in response to the operation of said retrieving control means, for selectively displaying either a first symbol indicating that a title and the corresponding text are stored and indicating the corresponding text, or displaying a second symbol indicating that the title and the corresponding text are not stored, wherein said display control means is constructed to display in one line the title, the symbol, and at least a portion of the corresponding text; and control means for allowing a text from said input means to be input successively after said display control means displays the first symbol or the second symbol.

9. An electronic apparatus according to claim 8, further comprising selecting means for selecting a text from among said plurality of texts stored in said memory means, corresponding to data input by said input means in response to an input operation of said data.

* * * * *

UNITED STATES PATENT AND TRADEMARK OFFICE
CERTIFICATE OF CORRECTION

PATENT NO. : 6,133,899

DATED : OCTOBER 17, 2000

INVENTOR(S): TAKAHIRO TSUKAMOTO

Page 1 of 2

It is certified that error appears in the above-identified patent and that said Letters Patent is hereby corrected as shown below:

SHEET NO. 7 OF THE DRAWINGS:
In Figure 5A-2, "REFFER" should read --REFER--.

COLUMN 1:
Line 7, "1998," should read --1988,--.

COLUMN 2:
Line 64, "texs" should read --texts--.

COLUMN 3:
Line 52, "alphabets" should read --letters--.

COLUMN 4:
Line 53, "therefor" should be deleted.

UNITED STATES PATENT AND TRADEMARK OFFICE
CERTIFICATE OF CORRECTION

PATENT NO. : 6,133,899

DATED : OCTOBER 17, 2000

INVENTOR(S): TAKAHIRO TSUKAMOTO

It is certified that error appears in the above-identified patent and that said Letters Patent is hereby corrected as shown below:

COLUMN 5:
Line 19, "claimed" should read --claim--.

Signed and Sealed this

Twenty-second Day of May, 2001

Attest:

NICHOLAS P. GODICI

Attesting Officer

Acting Director of the United States Patent and Trademark Office